(12) United States Patent
Nusier et al.

(10) Patent No.: US 9,126,550 B2
(45) Date of Patent: Sep. 8, 2015

(54) SLIDING DEFLECTOR ASSEMBLY

(71) Applicant: Ford Global Technologies, LLC, Dearborn, MI (US)

(72) Inventors: Saied Nusier, Canton, MI (US); Ridha Baccouche, Ann Arbor, MI (US); Rahul Arora, Royal Oak, MI (US); Saeed David Barbat, Novi, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 13/944,665

(22) Filed: Jul. 17, 2013

(65) Prior Publication Data

US 2015/0021936 A1    Jan. 22, 2015

(51) Int. Cl.
| | | |
|---|---|---|
| *B60R 19/16* | (2006.01) | |
| *B62D 21/15* | (2006.01) | |
| *B62D 25/08* | (2006.01) | |
| *B60R 19/14* | (2006.01) | |
| *B60R 21/00* | (2006.01) | |

(52) U.S. Cl.
CPC ............ *B60R 19/16* (2013.01); *B60R 19/14* (2013.01); *B62D 21/152* (2013.01); *B62D 25/082* (2013.01); *B60R 2021/0023* (2013.01)

(58) Field of Classification Search
CPC .................. B60R 19/16; B60R 2021/0023
USPC ............ 296/187.09, 187.1, 193.09; 293/114, 293/124, 149, 150, 151, 152, 154, 155; 280/784
See application file for complete search history.

(56) References Cited

U.S. PATENT DOCUMENTS

| | | |
|---|---|---|
| 5,275,436 A | 1/1994 | Pomero |
| 6,957,846 B2 | 10/2005 | Saeki |
| 7,523,979 B2 | 4/2009 | Jeong |
| 7,802,839 B2 | 9/2010 | Ajisaka |
| 7,819,218 B2 | 10/2010 | Eichberger et al. |
| 7,926,847 B2 | 4/2011 | Auer et al. |
| 8,336,933 B2 | 12/2012 | Nagwanshi et al. |
| 8,353,380 B2 | 1/2013 | Schonberger et al. |
| 8,398,153 B1 | 3/2013 | Dandekar et al. |
| 8,398,154 B1 | 3/2013 | Nusier et al. |
| 2008/0023954 A1* | 1/2008 | Eichberger et al. ........... 280/784 |
| 2012/0248820 A1 | 10/2012 | Yasui et al. |
| 2012/0313398 A1 | 12/2012 | Shin et al. |

* cited by examiner

*Primary Examiner* — H Gutman
(74) *Attorney, Agent, or Firm* — Raymond L. Coppiellie; Price Heneveld LLP

(57) ABSTRACT

A vehicle frame assembly is provided comprising a main rail. The vehicle frame assembly also includes a deflector assembly which has a front member having an inboard end pivotally coupled to the main rail and an outboard end. Moreover, the deflector assembly includes a rear member having an inboard end slidably coupled to the main rail and an outboard end pivotally coupled to the outboard end of the front member. Additionally, a tension member is disposed between the inboard ends of the front member and the rear member. The deflector assembly is operable between a normal use position wherein the tension member is slack and a collision position wherein the tension member is taut.

20 Claims, 4 Drawing Sheets

SLIDING DEFLECTOR ASSEMBLY

FIELD OF THE INVENTION

The present invention generally relates to a vehicle assembly, and more particularly to a vehicle frame having a deflector for lateral deflection during a frontal collision event.

BACKGROUND OF THE INVENTION

Vehicles that includes improved yet light weight collision technology increase value and safety to the consumer.

SUMMARY OF THE INVENTION

According to one aspect of the present invention, a vehicle frame assembly is provided which includes a main rail. The vehicle frame assembly also includes a deflector assembly which has a front member having an inboard end pivotally coupled to the main rail and an outboard end. Moreover, the deflector assembly includes a rear member having an inboard end slidably coupled to the main rail and an outboard end pivotally coupled to the outboard end of the front member. Additionally, a tension member is disposed between the inboard ends of the front member and the rear member. The deflector assembly is operable between a normal use position wherein the tension member is slack and a collision position wherein the tension member is taut.

According to another aspect of the present invention, a vehicle frame assembly is provided which includes a main rail. The vehicle frame assembly also includes a deflector assembly which has a front member having an inboard end pivotally coupled to the main rail and an outboard end. The deflector assembly further comprises a rear member having an inboard end slidably coupled to the main rail and an outboard end pivotally coupled to the outboard end of the front member. Moreover, a tension member is disposed between the inboard ends of the front member and the rear member.

Yet another aspect of the present invention includes a vehicle energy absorption assembly which includes a main rail and a deflector assembly. The deflector assembly includes a first member having an inboard end coupled to the main rail and an outboard end. The deflector assembly also includes a rear member having an inboard end slidably coupled to the main rail and an outboard end coupled to the outboard end of the front member. A load receiving member is disposed between the inboard ends of the front member and the rear member.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
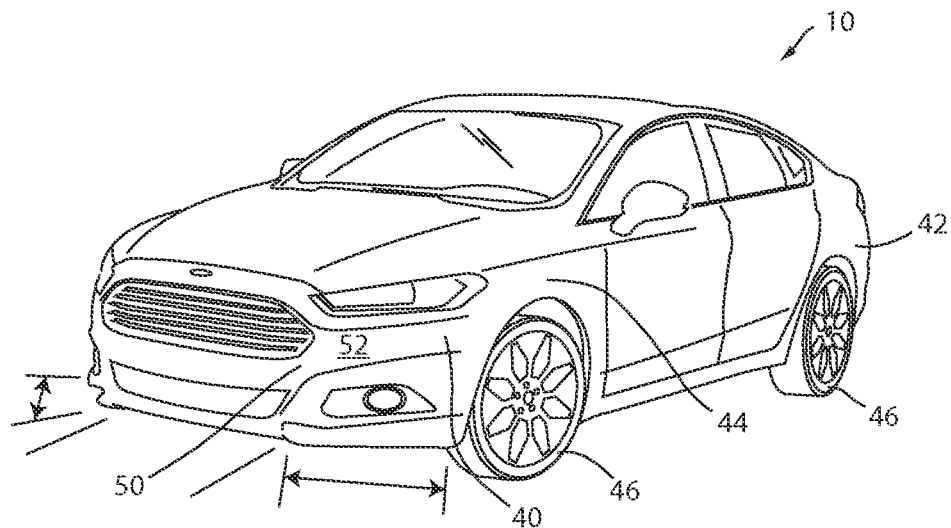
FIG. 1 is a top perspective view of a vehicle assembly according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments shown in FIGS. 1-4B, reference numeral 10 generally designates a vehicle having a vehicle frame assembly 12. The vehicle frame assembly 12 includes a main rail 14 and a deflector assembly 16. The deflector assembly 16 has a front member 18 having an inboard end 20 pivotally coupled to the main rail 14 and an outboard end 22. The deflector assembly 16 also includes a rear member 24 having an inboard end 26 slidably coupled to the main rail 14 and an outboard end 28 pivotally coupled to the outboard end 22 of the front member 18. A tension member 30 is disposed between the inboard ends 20, 26 of the front member 18 and the rear member 24. Moreover, the deflector assembly 16 is operable between a normal use position 32 where the tension member 30 is slack, and a collision position 34 where the tension member 30 is taut.

Referring now to FIG. 1, the vehicle 10 includes a front end 40, a rear end 42, and a vehicle body 44. The vehicle 10 also has multiple wheels 46. The vehicle 10 may be of any vehicle type including but not limited to a compact vehicle, a mid-size vehicle, a sport utility vehicle, a mini or full size van, or any type of truck. The vehicle 10 also includes a bumper 50.

Figure 2:
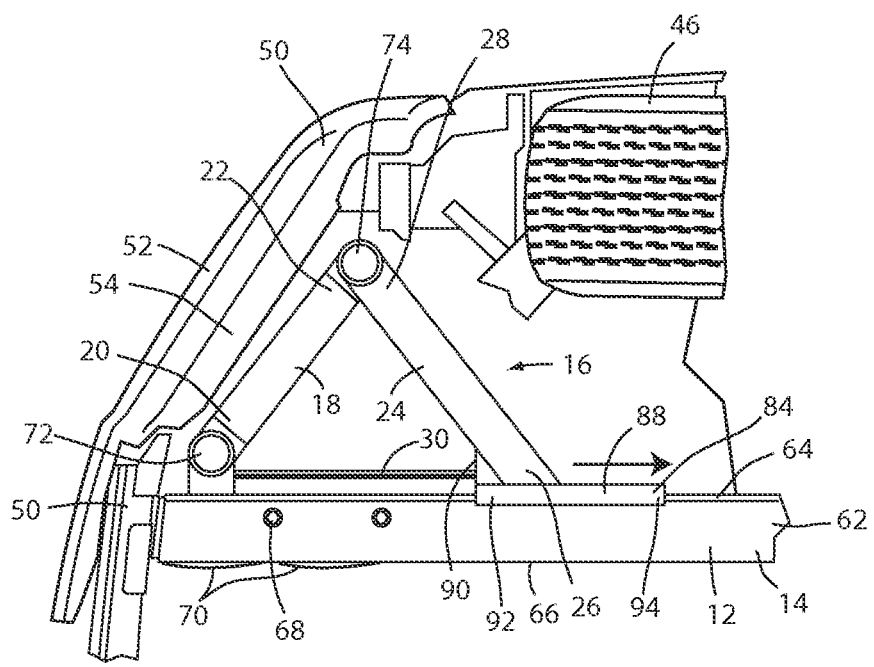
FIG. 2 is a partial bottom plan view of the vehicle assembly according to the present invention.

Referring now to the embodiment shown in FIG. 2, the bumper 50 is a dual layered bumper. An outside layer 52 of the bumper 50 is configured to be exposed externally. An inside layer 54 of the bumper 50 is disposed adjacent to the outside layer 52 and is operably coupled to the vehicle frame assembly 12, and more specifically operably coupled to the main rail 14. The bumper 50 is generally comprised of a sturdy plastic polymer material but may also be comprised of a steel or foam material which provides the structural strength necessary for the bumper 50 while also giving the structure a light weight feel. The bumper 50 has a color and material such that the bumper 50 blends well with the vehicle body 44 to provide a uniform look and feel to the vehicle 10. The inside layer 54 of the bumper 50 may also include one or more indents in order to more closely receive portions of the vehicle frame assembly 12 such as the main rail 14. The inside layer 54 also provides a buffer between the outside layer 52 and the vehicle frame assembly 12. The bumper 50 is configured to deform upon a frontal collision event. The deformation of the bumper 50 allows some of the force from the frontal collision event to be absorbed by the bumper 50 and helps distribute the force throughout the vehicle body 44.

Referring again to the embodiment shown in FIG. 2, the vehicle 10 includes the vehicle frame assembly 12 which is configured to support the vehicle body 44. The vehicle frame assembly 12 includes at least the main rail 14 and usually a lateral rail or other members. The main rail 14 extends from the bumper 50 to the rear end 42 of the vehicle 10. In the illustrated embodiment, the main rail 14 has a square cross section and is comprised of a strong steel material in order to support the weight of the vehicle body 44. However, the main rail 14 may have any cross-section configured or designed to support the vehicle body 44 including but not limited to a plus-shaped cross-section, a triangular cross-section, a circular cross-section, and a trapezoidal cross-section. Additionally, the main rail 14 may be comprised of any material capable of providing support to the vehicle body 44, including but not limited to stainless steel, brushed steel, or a strong plastic polymer material. The main rail 14 has a top surface 60 (see FIG. 3B) and a bottom surface 62 along with a first side surface 64 and a second side surface 66. In the illustrated embodiment, the main rail 14 is hollow in the center to provide a light weight structure. However, the main rail 14 may also be a solid structure to provide additional strength to the vehicle frame assembly 12. The main rail 14 may also include a plurality of bolt holes 68 in order to attach the radiator, supporting brackets, or other elements to the main rail 14. Bumps 70 may be disposed on the first side 64 or the second side 66 of the main rail 14. The bumps 70 are configured to allow the main rail 14 to fold in accordion like style during the frontal collision event. It is also contemplated that the main rail 14 may not include bumps 70 or may include non-rounded bumps such as square or triangular shaped bumps.

Figure 3A:
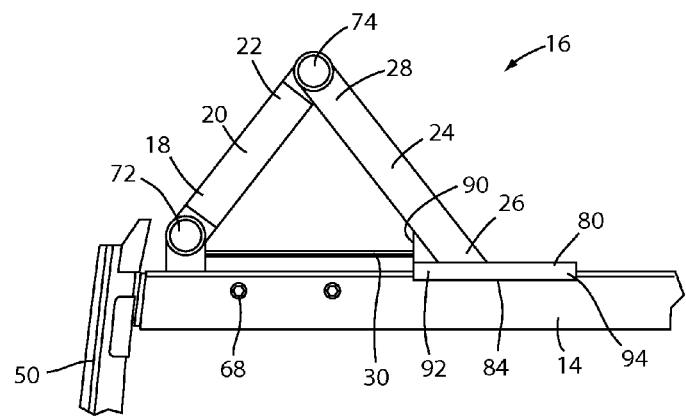
FIG. 3A is a bottom perspective view of one embodiment of a deflector assembly according to the present invention.
Figure 3B:
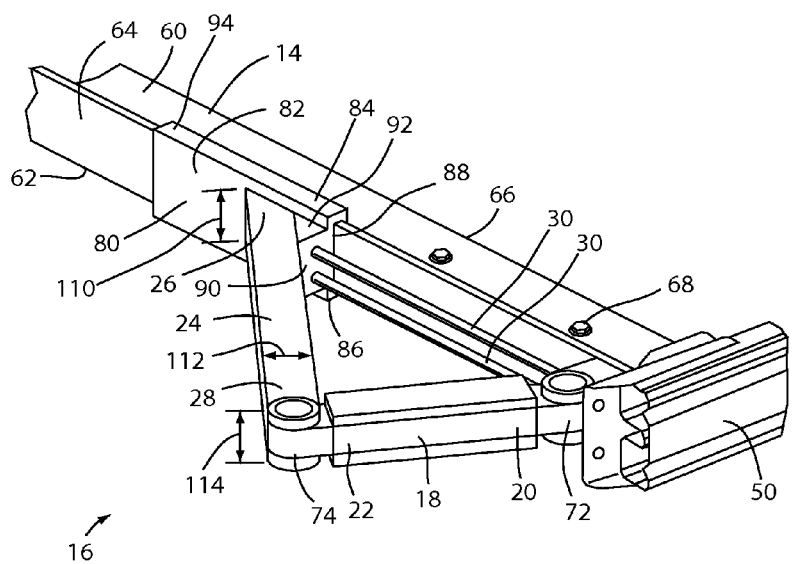
FIG. 3B is a side perspective view of the deflector assembly of FIG. 3A.

Referring now to the embodiments shown in FIGS. 2, 3A and 3B, the deflector assembly 16 includes the front member 18 and the rear member 24 which, along with the tension member 30, form a generally triangular structure. The front member 18 is generally a rectangular structure having an inboard end 20 pivotally coupled to the main rail 14 and extending at an angle to the outboard end 22. The inboard end 20 of the front member 18 is pivotally coupled to the main rail 14 using a first cylindrical joint 72. The outboard end 22 of the front member 18 is pivotally coupled to a second cylindrical joint 74.

Referring to the embodiment shown in FIGS. 3A-3B, the rear member 24 of the deflector assembly 16 is shaped similar to the front member 18 having a generally rectangular structure. The outboard end 28 of the rear member 24 is operably coupled to the outboard end 22 of the front member 18, usually through the second cylindrical joint 74. The outboard end 22 of the front member 18 and the outboard end 28 of the rear member 24 may also be coupled by any method as known by one skilled in the art such as any other joint having a smooth surface allowing both the front member 18 and the rear member 24 to rotate freely around the joint. The inboard end 26 of the rear member 24 is operably coupled to the main rail 14, usually slidably coupled. The inboard end 26 of the rear member 24 includes a flat slider portion 80 which is disposed in abutting contact with the main rail 14. The front and rear members 18, 24 are generally comprised of steel including but not limited to brushed steel or stainless steel. Moreover, the front member 18 and the rear member 24 are generally hollow to provide the deflector assembly 16 with a light weight structure. Additionally, the front member 18 and the rear member 24 may be solid structures and be comprised of foam or a plastic polymer material.

Referring now to the embodiment shown in FIGS. 3A-3B, operably coupled to the inboard end 26 of the rear member 24 is the slider portion 80. The slider portion 80 is disposed between the inboard end 26 of the rear member 24 and the main rail 14. The slider portion 80 is generally in abutting contact with the main rail 14 and includes a generally flat top surface 82. The slider portion 80 is comprised of the same material as the main rail 14, usually steel. The slider portion 80 is generally rectangular in shape and includes a first flange 84 and a second flange 86 which form a receiving aperture 88 configured to receive a portion of the main rail 14 in order to allow the slider portion 80 to slide down the main rail 14 during the collision event. Moreover, the receiving aperture 88 of the slider portion 80 also has the same shape as the main rail 14 in order to provide easy slidability to the slider portion 80 on the main rail 14.

Referring again to the embodiment shown in FIGS. 3A-3B, the tension member 30 is operably coupled to the slider portion 80. The tension member 30 may be connected to the slider portion 80 using any conventional connection means such as a bracket, bolts, or other connectivity. Although two tension members 30 are illustrated, it will be understood that there may be greater or less than two tension members 30. The slider portion 80 further includes a connector member 90 which extends from a front end 92 of the slider portion 80 to the inboard end 26 of the rear member 24 in order to provide additional support for the deflector assembly 16. The slider portion 80 further includes a rear end 94. The connector member 90 is generally comprised of the same material as the front member 18 and the rear member 24 which is generally a hollow steel material. When the deflector assembly 16 is in the normal use position 32 (see FIG. 4A), the slider portion 80 is stationary. When the deflector assembly 16 is in the collision position 34, the slider portion 80 is moved towards the rear end 42 of the vehicle 10 along the main rail 14 until the tension member 30 is taut.

Referring again to the embodiment shown in FIGS. 3A-3B, the front 18 and rear 24 members generally have a width 110 of approximately 0.5 to 2 inches, and usually approximately 1 inch. Moreover, the front 18 and rear 24 members have a thickness 112 of approximately 2 to 4 mm and usually approximately 3 mm. The first and second cylindrical joints 72, 74 allow the deflector assembly 16 to rotate or pivot in order to provide lateral vehicle deflection or transfer of force from the deflector assembly 16 to the vehicle frame assembly 12. The first and second cylindrical joints 72, 74 generally have a height 114 similar to the width 110 of the front 18 member and the width 110 of the rear 24 member. Specifically, approximately 0.5 to 2 inches, and usually approximately 1 inch.

Referring now to the embodiment shown in FIGS. 3A-4B, the tension member 30 is disposed between the inboard end 20 of the front member 18 and the inboard end 26 of the rear member 24. The tension member 30 is generally disposed in a parallel relationship with the main rail 14. However, when the deflector assembly 16 is in the normal use position 32, the tension member 30 may have slack. The slack may be visible slack such that the tension member 30 is non-linear when the deflector assembly 16 is in the normal use position 32 (see FIG. 4A), or slack such that the tension member 30 is still linear but is not fully taut (see FIG. 3A). Moreover, the tension member 30 may be a single tension cable or multiple tension cables in a parallel relationship. Multiple cables allow the tension member 30 to be light weight and thin while still providing the necessary tension force between the rear member 24 and the front member 18.

Figure 4A:
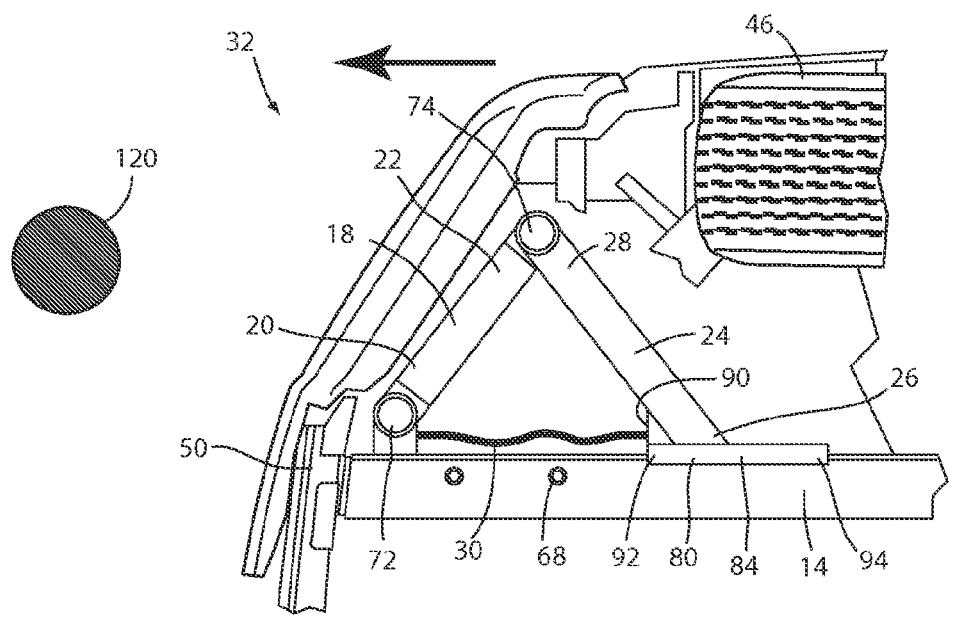
FIG. 4A is a partial bottom plan view of the vehicle assembly of FIG. 2 prior to a collision event.
Figure 4B:
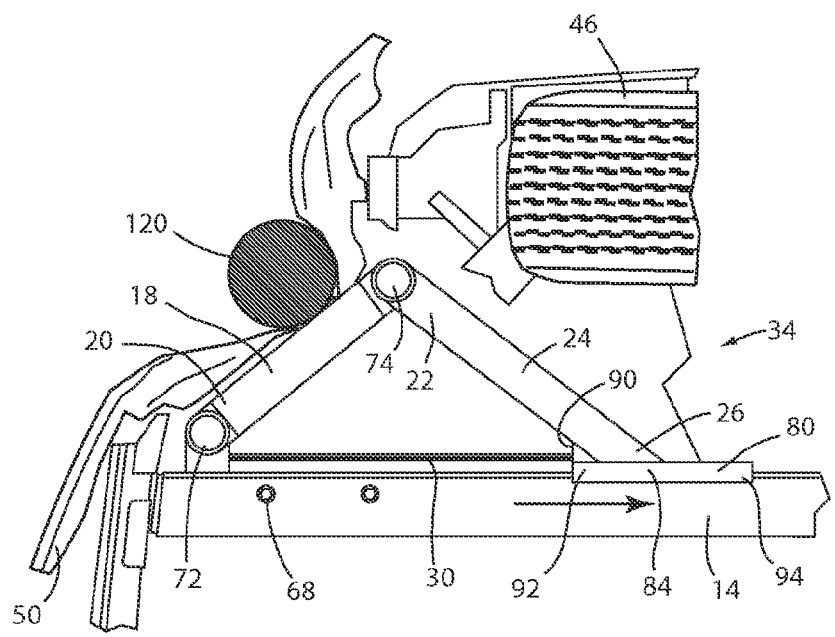
FIG. 4B is a partial bottom plan view of the vehicle assembly of FIG. 2 after a collision event.

Referring now to the embodiment shown in FIGS. 4A and 4B, in operation, the deflector assembly 16 begins in the normal use position 32 as the vehicle 10 is traveling in a generally forward direction (see FIG. 4A). When the vehicle 10 encounters a rigid barrier 120, such as a small off-set rigid barrier, in the frontal collision event, the bumper 50 is deformed, as shown in FIG. 4B, causing the deflector assembly 16 to be moved into the collision position 34. The deflector assembly 16 is then configured to deflect the vehicle 10 laterally upon impact with the rigid barrier 120. The deflector assembly 16 also provides a uniform load distribution of the force from the frontal collision event to the main rail 14 which allows less main rail 14 deformation and more vehicle lateral push which results in less intrusion and vehicle 10 deformation during the frontal collision event with the rigid barrier 120. The deflector assembly 16 is also configured to absorb energy from the frontal collision event resulting in less vehicle deformation and intrusion. In the normal use position 32, the tension member 30 is slack and may be non-linear as shown in FIG. 4A. During the frontal collision event, the front bumper 50 abuts the front member 18 which in turn slides the rear member 24 including the slider portion 80 down the main rail 14 until the tension member 30 is taut. During the frontal collision event, the slider portion 80 moves approximately 0.5 to 3 inches, and usually approximately 1-2 inches down the main rail 14 toward the rear end 42 of the vehicle 10.

Figure 5A:
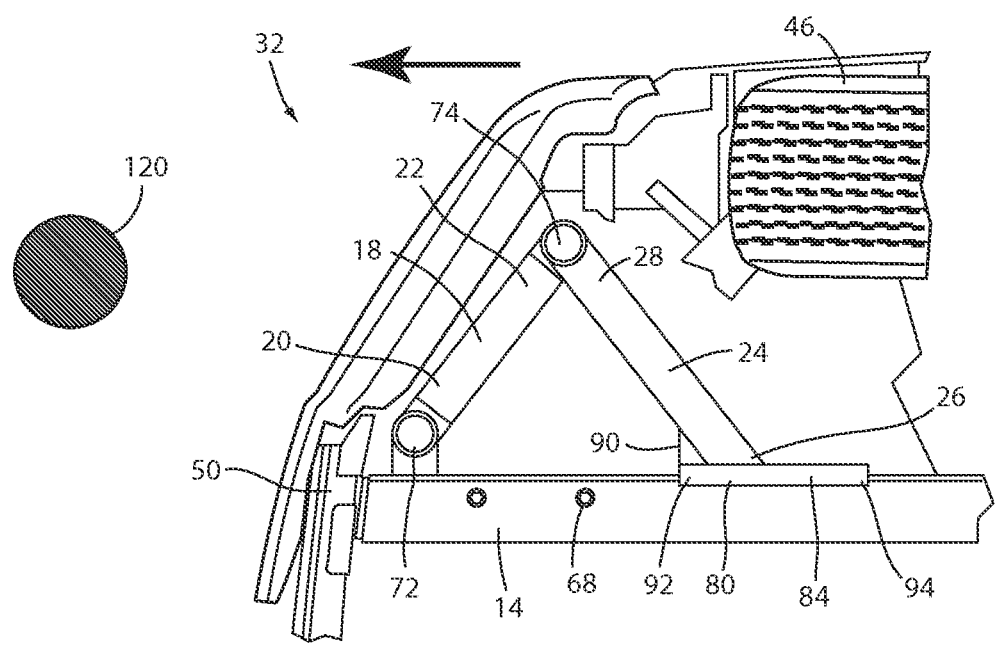
FIG. 5A is a partial bottom plan view of another embodiment of a deflector assembly for a vehicle before a collision event.
Figure 5B:
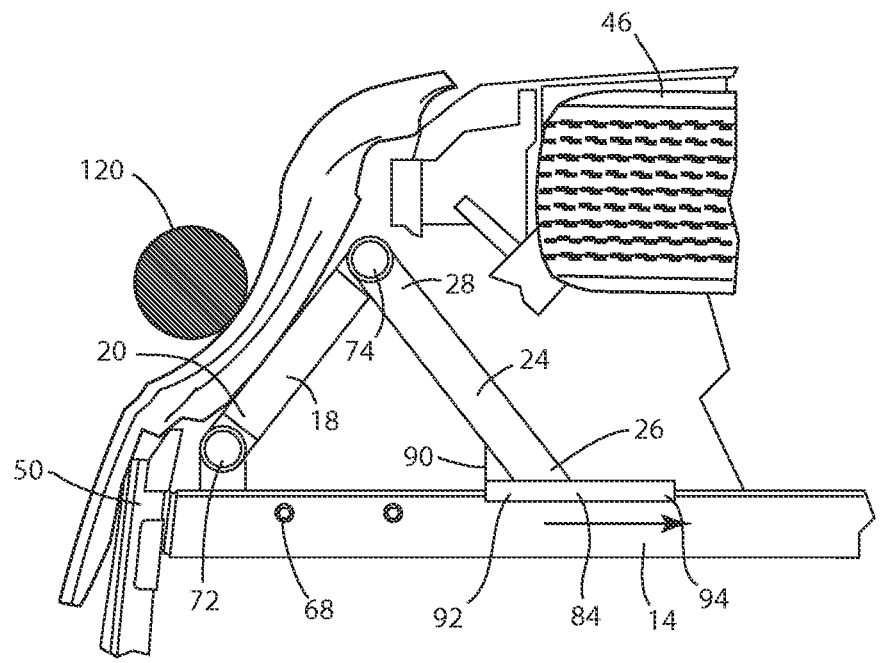
FIG. 5B is a partial bottom plan view of the embodiment shown in FIG. 5A after a collision event.

Referring now to the embodiment shown in FIG. 5A-5B, the vehicle 10 assembly may include many of the same features as described above including the vehicle frame assembly 12, the main rail 14, and the deflector assembly 16. The deflector assembly 16 may also include many of the same features as described above including the front member 18, the rear member 24, the slider portion 80, the connector member 90, and first and second cylindrical joints 72, 74. However, the front member 18 and the rear member 24 may be connected by the first cylindrical joint 72, alone, and the deflector assembly 16 may not include a tension member 30. The deflector assembly 16 is still configured to deflect the vehicle 10 laterally during the frontal collision event and to provide a uniform load distribution of the force from the frontal collision event to the main rail 14. However, during the frontal collision event, the slider portion 80 and rear member 24 remain stationary. Alternatively, the first and second cylindrical joints 72, 74 may be spring-biased to counteract the forces acting on the deflector assembly 16 during a collision event. In this instance the slider portion 80 of the deflector assembly 16 would move along the main rail 14 but would be biased by the springs of the first and second cylindrical joints 72, 74 to return to the normal use position 32.

Referring again to the embodiments shown in FIGS. 5A-5B, the deflector assembly 16 may include many of the same features as described above with respect to the embodiments shown in FIGS. 4A-4B, including the width 110 and thickness 112 of the front 18 and rear 24 members and the height 114 of the first and second cylindrical joints 72, 74. Referring again to the embodiment shown in FIGS. 5A-5B, the embodiment shown in FIGS. 5A-5B operates similar to the embodiment shown in FIGS. 4A-4B. Specifically, the deflector assembly 16 begins in the normal use position 32 as the vehicle 10 is traveling in the generally forward direction (see FIG. 5A). When the vehicle 10 encounters the rigid barrier 120, such as the small offset rigid barrier, which is usually a telephone pole, in the frontal collision event, the bumper 50 is deformed, as shown in FIG. 5B, causing the bumper 50 to come into abutting contact with the front member 18 of the deflector assembly 16. The deflector assembly 16 is then configured to deflect the vehicle 10 laterally upon impact with the rigid barrier 120. The deflector assembly 16 also provides a uniform load distribution of the force from the frontal collision event to the main rail 14 which allows less main rail 14 deformation and more vehicle 10 lateral push which results in less intrusion and vehicle 10 deformation during the frontal collision event with the rigid barrier 120. The deflector assembly 16 is also configured to absorb energy from the frontal collision event resulting in less vehicle 10 deformation and intrusion by the rigid barrier 120 into the vehicle 10.

The present invention is to address injuries resulting from crashes involving vehicles into small off-set rigid barriers 120 such as telephone poles. Tests of current vehicle structures reveal the need for improvement in order to adequately address small off-set impact situations. The present invention features a generally triangular shaped deflector assembly 16 which acts as a ramp for deflecting the vehicle 10 laterally upon impact with the small off-set rigid barrier 120. The deflector assembly 16 also absorbs some of the force from the frontal collision and also provides a uniform load distribution to the vehicle frame assembly 12 which results in less local main rail 14 deformation. The deflector assembly 16 also provides vehicle 10 lateral push which moves the vehicle 10 and the passenger away from the small off-set rigid barrier 120 and decreases intrusion into the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied.

It should be noted that the elements and/or assemblies of the system may be constructed from any of a wide variety of materials that provide sufficient strength or durability, in any of a wide variety of colors, textures, and combinations.

Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle frame assembly comprising:
   a main rail;
   a deflector assembly including:
      a front member having an inboard end pivotally coupled to the main rail and an outboard end;
      a rear member having an inboard end slidably coupled to the main rail and an outboard end pivotally coupled to the outboard end of the front member; and
   a tension member disposed between the inboard ends of the front member and the rear member, wherein the deflector assembly is operable between a normal use position wherein the tension member is slack and a collision position wherein the tension member is taut.

2. The vehicle frame assembly of claim 1, wherein the main rail includes a slider portion.

3. The vehicle frame assembly of claim 2, wherein when the deflector assembly is moved from the normal use position to the collision position the slider portion is moved rearward on the main rail.

4. The vehicle frame assembly of claim 1, wherein the deflector assembly is configured to move from the normal use position to the collision position by a frontal collision event.

5. The vehicle frame assembly of claim 1, wherein when the deflector assembly is in the collision position, the deflector assembly is configured to impose a tension force on the tension member.

6. The vehicle frame assembly of claim 4, wherein the deflector assembly is configured to deflect the vehicle frame laterally during the frontal collision event.

7. The vehicle frame assembly of claim 1, wherein the front member and the rear member are pivotally connected by a cylindrical joint.

8. The vehicle frame assembly of claim 1, wherein the front member is pivotally coupled to the main rail using a cylindrical joint.

9. A vehicle frame assembly comprising:
   a main rail;
   a deflector assembly including:
      a front member having an inboard end pivotally coupled to the main rail and an outboard end;
      a rear member having an inboard end slidably coupled to the main rail and an outboard end pivotally coupled to the outboard end of the front member; and
   a tension member disposed between the inboard ends of the front member and the rear member.

10. The vehicle frame assembly of claim 9, wherein the main rail includes a slider portion.

11. The vehicle frame assembly of claim 9, wherein the deflector assembly is operable between a normal use position corresponding with the tension member being slack and a collision position corresponding with the tension member being taut.

12. The vehicle frame assembly of claim 9, wherein when the deflector assembly is in the collision position, the deflector assembly is configured to transfer force to the vehicle frame.

13. The vehicle frame assembly of claim 9, wherein the deflector assembly is moved from the normal use position to the collision position by a frontal collision event.

14. The vehicle frame assembly of claim 9, wherein the front member and the rear member are pivotally connected by a cylindrical joint.

15. A vehicle energy absorption assembly comprising:
   a main rail;
   a deflector assembly including:
      a front member having an inboard end coupled to the main rail and an outboard end;
      a rear member having an inboard end slidably coupled to the main rail and an outboard end coupled to the outboard end of the front member; and
   a load receiving member disposed between the inboard ends of the front member and the rear member.

16. The vehicle energy absorption assembly of claim 15, wherein the deflector assembly is configured to be in a normal use position or a collision position.

17. The vehicle energy absorption assembly of claim 15, wherein the front member and the rear member are operably coupled using a cylindrical joint.

18. The vehicle energy absorption assembly of claim 16, wherein when the deflector is in the collision position, the deflector assembly is configured to transfer force to the main rail.

19. The vehicle energy absorption assembly of claim 17, wherein the load receiving member is disposed generally parallel to the main rail.

20. The vehicle energy absorption assembly of claim 15, wherein the front member is pivotally coupled to the main rail by a cylindrical joint.

* * * * *